Aug. 15, 1950 M. K. HORAN ET AL 2,518,691
MEANS FOR RECORDING THE READINGS OF METERS
Filed Feb. 20, 1948 2 Sheets-Sheet 1
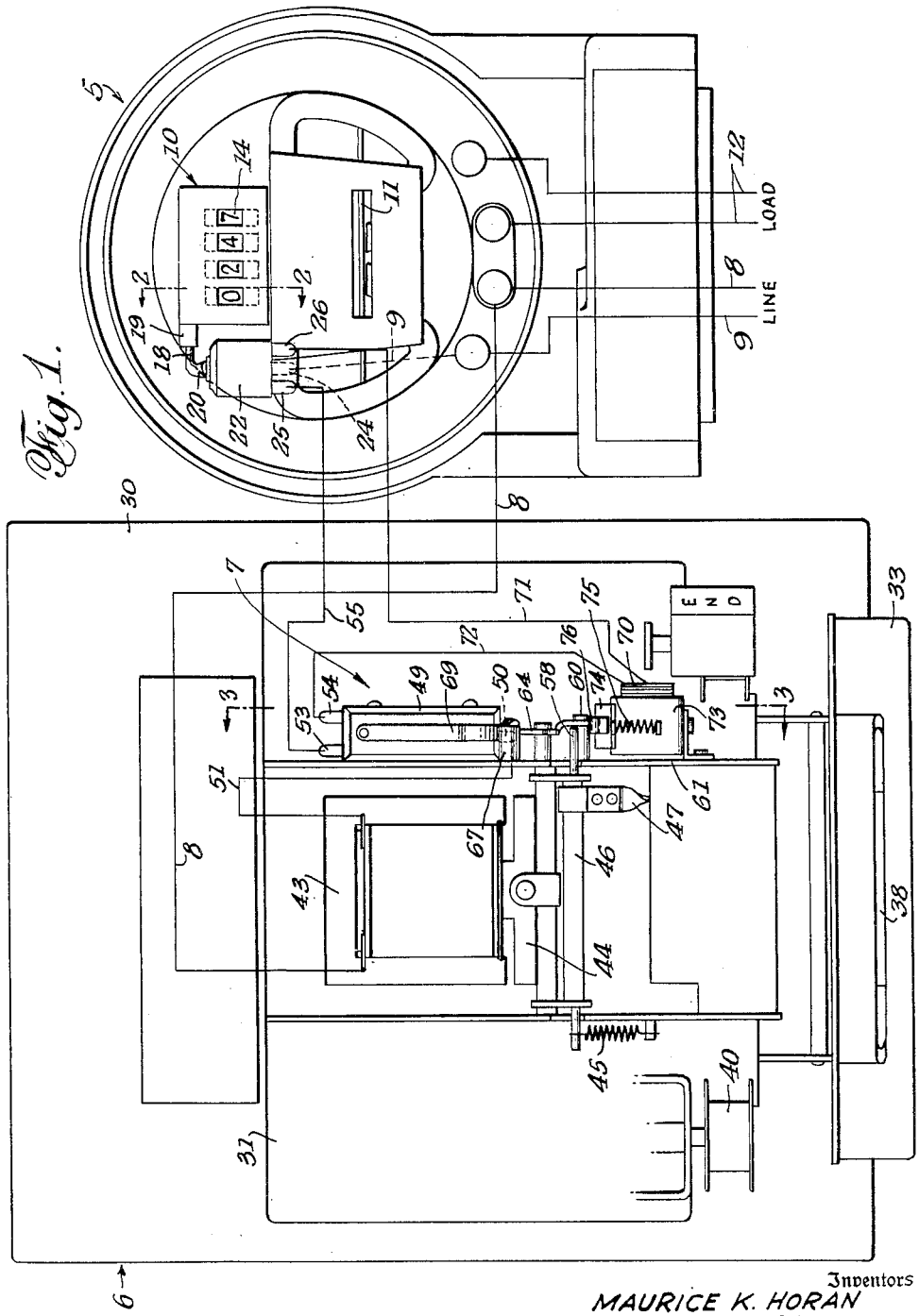
Inventors
MAURICE K. HORAN
JOHN W. CADE
By
C. G. Stratton
Attorney Aug. 15, 1950　　　　M. K. HORAN ET AL　　　　2,518,691
MEANS FOR RECORDING THE READINGS OF METERS
Filed Feb. 20, 1948　　　　　　　　　　　　　2 Sheets-Sheet 2
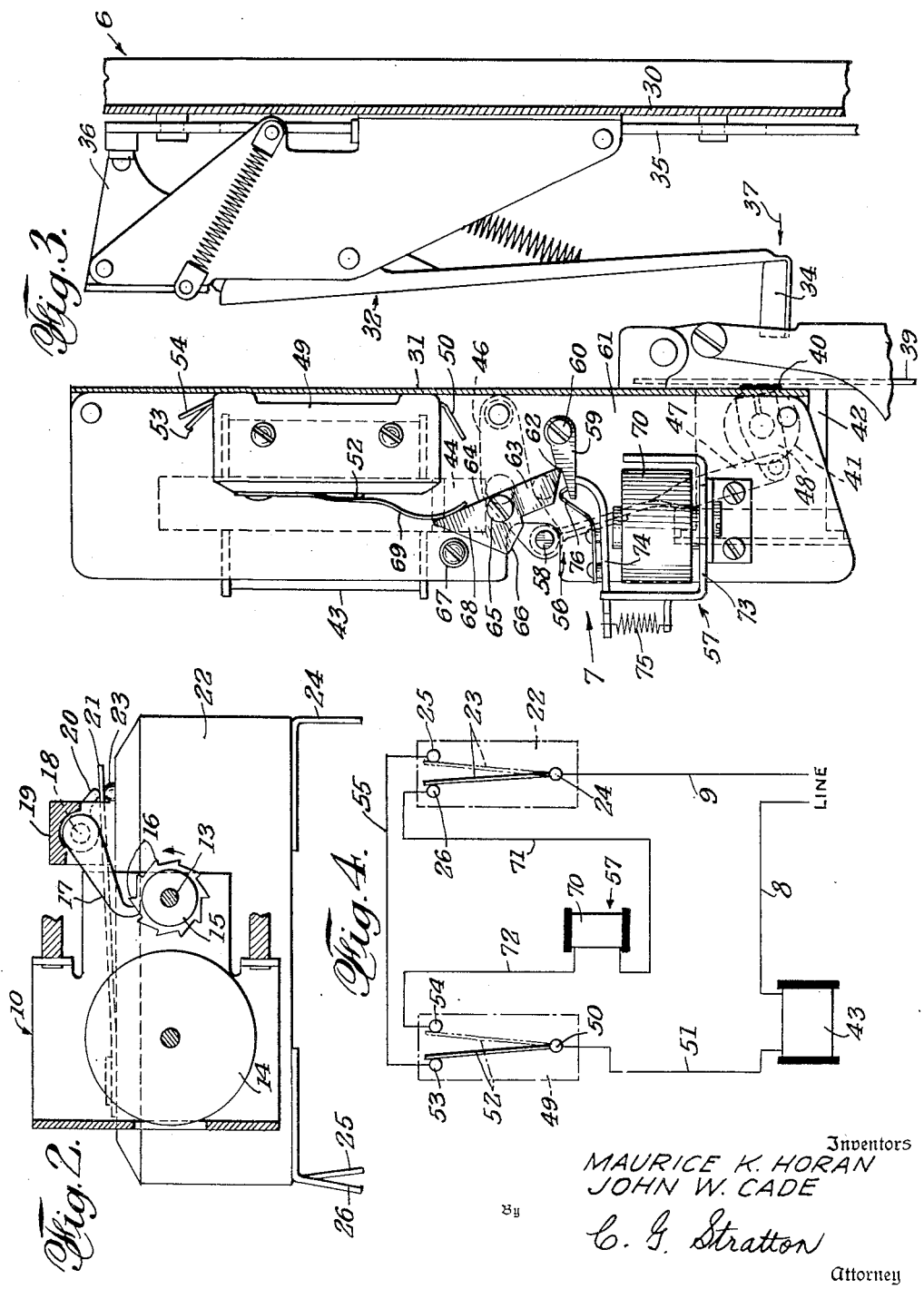
Inventors
MAURICE K. HORAN
JOHN W. CADE
By C. G. Stratton
Attorney Patented Aug. 15, 1950

2,518,691

UNITED STATES PATENT OFFICE 2,518,691

MEANS FOR RECORDING THE READINGS OF METERS

Maurice K. Horan, North Hollywood, and John W. Cade, La Canada, Calif., assignors, by direct and mesne assignments, of twenty per cent to Louis W. Valbert, Barstow, thirty per cent to Welden F. Barnes, Glendale, thirty-five per cent to said Horan, ten per cent to said Cade, and five per cent to Lawrence C. Fay, Los Angeles, Calif.

Application February 20, 1948, Serial No. 9,928

6 Claims. (Cl. 346—14)

This invention relates to means for recording the readings of meters such as watt-hour meters, gas meters, water meters, etc.

An object of the present invention is to provide means for obtaining a printed record of the reading of a meter to thereby obviate error, save time, and provide an incontestible record.

Another object of the invention is to provide a novel combination that comprises a meter and a printing unit, said meter and printing unit being so interconnected that the latter is conditioned by the former to set up a number representing current, gas, or water consumption, and said printing unit being adapted to be manually operated to print said number on a card or the like for obtaining a record thereof.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a face view of a wattmeter and a printing recorder and embodying means interconnecting the same according to the present invention, the covers for the meter and recorder being omitted for clarity, and the conventional elements not necessary to be described being also omitted.

Fig. 2 is an enlarged cross-sectional view as taken on line 2—2 of Fig. 1.

Fig. 3 is a vertical sectional view as taken on line 3—3 of Fig. 1.

Fig. 4 is a wiring diagram illustrating, schematically, the electrical circuit shown in Fig. 1.

The invention is herein disclosed to record the readings of a wattmeter and because of the availability of electric current in this connection, the means operatively connecting said meter to a printing recorder is shown as electrically operated. However, it will be understood that the invention is equally adapted to obtain printed recordings of the readings of gas, water meters, and the like, and while the operative connection between such meters and a printing recorder may be electrical, such connection may feasibly be mechanical and yet fall within the concepts of the present invention.

In that embodiment of the invention which is illustrated, a conventional watt-hour meter 5 is connected to a conventional printing recorder 6 by novel means 7 that sets up, in the recorder, a number corresponding to the reading of the meter, said recorder embodying means for printing said number on a card or the like.

The recorder 6 is a machine of the type used with time clocks and is designed to print time cards. In this instance, since the present device may be used in places exposed to the weather, the recorder is preferably inverted from its normal position so that the opening, receptive of the card to be printed, faces downwardly.

The watt-hour meter 5 is placed in an electric line represented by conductors 8 and 9 so as to set up on the cyclometer 10 the number of revolutions made by the disc 11 and to thereby register the current consumption in the load line 12. The revolutions of disc 11, through suitable gearing (not shown) drive a shaft 13 (Fig. 2) and said shaft is geared to drive the counter 14 of the cyclometer. For the purposes of this invention, the counter 14 may be omitted, but may be used where a visual reading of the wattage used is desired.

According to the invention, a cam wheel 15 is mounted on shaft 13 and the same is formed with ten lobes 16. An arm 17 is engaged with the cam to rise and fall, under control of the cam lobes, on a pivot 18 in a block 19 mounted on the cyclometer. A second arm 20, on said pivot, engages the spring arm 21 of a "microswitch" 22 to effect control of its contact member 23. The latter is electrically connected to a terminal 24 and is movable for alternate contact with terminals 25 and 26. Thus, the microswitch is of the single-pole-double-throw type. When the arm 17 is low on a cam lobe, arm 20 is raised and contact member 23 is engaged with terminal 26. When a cam lobe raises arm 17, said member 23 is moved into contact with terminal 25. Thus, for each angular traverse of the cam for the angular increment of a lobe, contact member is moved first to engage terminal 26 and then terminal 25.

The conventional printing recorder that is shown comprises a base plate 30 which supports a sub-base plate 31 in spaced relation as best seen in Fig. 3. Between said plates is mounted a manually operable mechanism 32 that includes an actuator 33, a hammer or platen 34, a slide 35 connected to the actuator, and trip means 36 operated by the slide to first withdraw the striker 34 and then release the same for rapid striking movement in the direction of arrow 37.

The recorder further conventionally includes a guide throat 38 for a card 39 that is adapted to be positioned in the path of movement of the platen 34 to receive the blow thereof and to be pressed against an inked ribbon 40 passing in front of printing rolls 41 mounted in a counterlike unit 42. The platen thus imprints on card 39 that number that is set up on printing rolls 41.

In recorders used in connection with time clocks, the printing rolls have numbers corresponding to hours and minutes. In this instance, the unit 42 is replaced with one that records numerically to correspond with the numerical setup of cyclometer 10.

A solenoid 43 intermittently feeds rolls 41. Each time said solenoid is energized, its armature 44 is sucked in against the pull of spring 45, a pivoted frame 46, connected to the armature, is pulled, and a connection 47 between said frame and an arm 48 on the unit 42, actuates said arm to effect successive intermittent movement of printing rolls 41.

The above-described generally conventional recorder is provided with the means 7 for setting up on the rolls 41 the number corresponding to the reading of the cyclometer 10. Said means 7 includes the cam 15, arms 17 and 18, and switch 22, and further includes a second single-pole-double-throw "microswitch" 49 that has a terminal 50 connected by a conductor 51 to solenoid 43, said solenoid being connected to the line conductor 8. A contact member 52 is connected to terminal 50 and is movable between terminals 53 and 54. Terminal 25 of switch 22 is connected by a conductor 55 to terminal 53 of switch 49.

Since the cam 15 turns very slowly at times and may even be stationary for long periods of time, the arm 17 has a long time engagement with each successive cam lobe 16. Consequently, it is desired to effect immediate opening of the circuit that is made when switch arm 23 is moved by a cam lobe to engage terminal 26. Also, after said circuit is opened, it is desired to reset switch arm 23 on contact 25 to be ready to operate by actuation of the next successive cam lobe. Accordingly, the means 7 includes a trigger mechanism 56 that controls switch 49, and a trigger solenoid 57 that controls the trigger mechanism to trip the same. Said trigger mechanism is mechanically operated to cock by an extension 58 provided on frame 46.

Said trigger mechanism comprises a trigger 59 that is pivoted at 60 on a plate 61 mounted on the sub-base plate 31. Said trigger is provided with a shoulder 62 that is engaged by an end 63 of a sear 64 pivoted at 65 on plate 61. Said sear is formed with a sloping cam edge 66 that is in the path of movement of extension 58. A stop 67 is provided for the end 58 of the sear that is on the opposite side of pivot 65 from end 63. Switch 49 has an actuating spring arm 69 that is moved by the sear to effect movement of switch arm 52 between terminals 53 and 54.

The trigger solenoid 57 includes a coil 70 that is connected in series between switch terminals 26 and 54 by means of conductors 71 and 72, a frame 73 mounting said coil on plate 61, and an armature 74 pivotally carried by the frame. A spring 75 moves armature 74 to bear against one edge of trigger 59 on one side, and a resilient finger 76, carried by the armature, bears against the opposite edge of said trigger.

The operation is as follows: When arm 17 is on a low part of a cam lobe 16, switch arm 23 is on terminal 26 and switch arm 52 is on terminal 53. Consequently, the circuit is open at terminals 25 and 54. As cam wheel 15 rotates under influence of the watt-hour meter, the cam lobe 16 engaged with arm 17 will raise the latter until switch arm 23 is snapped to engage terminal 25. There will thus be established a circuit from line conductor 9, through switch 22, conductor 55, switch 49, conductor 51, solenoid 43, and line conductor 8. Energization of solenoid 43 results, its armature 44 is sucked in, the frame 46 is tilted, and connection 47 actuates arm 48 to effect an angular transition of printing rolls 41. Simultaneously, extension 58 of frame 46 engages cam edge 66 of the sear 64 and rocks said sear to engage or cock its end 63 on shoulder 62 of trigger 59. This movement of the sear, causes the end 68 to press on spring arm 69 of switch 49 and the latter snaps switch arm 52 into contact with terminal 54. The mentioned circuit through solenoid 43 is thus opened although arm 17 is still riding the cam lobe.

This condition maintains until the cam lobe moves past arm 17. Said arm will then drop under force of spring arm 21 and switch arm 23 will return to terminal 26. A circuit is now established from line conductor 9, switch 22, conductor 71, trigger solenoid coil 70, conductor 72, switch 49, conductor 51, solenoid 43, and line conductor 8. Since the resistance in solenoid 43 is much greater than that in the smaller solenoid coil 70, the former will not be energized sufficiently to cause movement of its armature. However, solenoid 57 will become energized, its armature 74 will be sucked in, and the same will trip trigger 59 and release sear 64. Spring arm 69 will thus be released, and switch arm 52 will fall back to contact terminal 53. In this manner, the switches are restored to their initial condition so that the next time a lobe raises arm 17, the foregoing cycle of operation is instituted.

It will be seen that for each one-tenth of a rotation of shaft 13, one number increment is added to printer rolls 41. The same increment, of course, is added to counter 14.

At any time that it is desired, a card 39 may be inserted into throat 38, the actuator 33 raised, and the platen 34 will print on said card the number set up on printing rolls 41 and said number will correspond with the number on counter 14.

While we have illustrated and described what we now regard as the preferred embodiment of our invention, the construction is, of course, subject to modifications without departing from the spirit and scope of our invention. We, therefore, do not wish to restrict ourselves to the particular form of construction illustrated and described, but desire to avail ourselves of all modifications that may fall within the scope of the appended claims.

Having thus described our invention, what we claim and desire to secure by Letters Patent is:

1. Apparatus of the character described, comprising a consumption registering device, said device including a shaft driven thereby, a multilobed cam on said shaft, a switch controlled by said cam, a printing recorder having printing rolls and embodying means for advancing said rolls, a second switch carried by the recorder, an electric circuit connecting said switches and the rolls advancing means for operating the latter intermittently under control of the lobes of the cam, trigger mechanism controlling said second switch, and an electrical device in said circuit and arranged to control the trigger mechanism alternately with the printing rolls operating means.

2. Apparatus of the character described, comprising a consumption registering device, said device including a shaft driven thereby, a multi-lobed cam on said shaft, a switch controlled by said cam, a printing recorder having printing rolls and embodying means for advancing said rolls, a second switch carried by the recorder, a normally open electric circuit connecting said switches and the rolls advancing means, a lobe of said cam being adapted to operate the first switch to close said circuit and operate the rolls advancing means, and means controlled by said rolls advancing means for operating the second switch to open said circuit subsequent to the operation of the rolls advancing means.

3. Apparatus of the character described, comprising a consumption registering device, said device including a shaft driven thereby, a multi-lobed cam on said shaft, a switch controlled by said cam, a printing recorder having printing rolls and embodying means for advancing said rolls, a second switch carried by the recorder, a normally open electric circuit connecting said switches and the rolls advancing means, a lobe of said cam being adapted to operate the first switch to close said circuit and operate the rolls advancing means, and means controlled by said rolls advancing means for operating the second switch to open said circuit subsequent to the operation of the rolls advancing means, said latter means including a trigger mechanism operatively associated with the second switch and arranged to be tripped by the rolls advancing means.

4. Apparatus of the character described, comprising a consumption registering device, said device including a shaft driven thereby, a multi-lobed cam on said shaft, a switch controlled by said cam, a printing recorder having printing rolls and embodying means for advancing said rolls, a second switch carried by the recorder, a normally open electric circuit connecting said switches and the rolls advancing means, a lobe of said cam being adapted to operate the first switch to close said circuit and operate the rolls advancing means, means controlled by said rolls advancing means for operating the second switch to open said circuit subsequent to the operation of the rolls advancing means, said latter means including a trigger mechanism operatively associated with the second switch and arranged to be tripped by the rolls advancing means, and an electric solenoid in said circuit arranged to cock said switch alternately with the printing rolls operating means.

5. Apparatus of the character described, comprising a consumption registering device, said device including a shaft driven thereby, a multi-lobed cam on said shaft, a printing recorder having printing rolls and embodying a solenoid for advancing said printing rolls intermittently, a switch carried by the meter and controlled between two positions by the lobes of said cam, a second switch carried by the recorder, a normally open electric circuit connecting the switches and the solenoid, and trigger mechanism controlling said second switch between two positions and operable to cock by the solenoid, any lobe of said cam being adapted to actuate the first switch to close said circuit and energize the solenoid to advance the printing rolls and simultaneously cock the trigger mechanism and operate the second switch to again open said circuit.

6. Apparatus of the character described, comprising a consumption registering device, said device including a shaft driven thereby, a multi-lobed cam on said shaft, a printing recorder having printing rolls and embodying a solenoid for advancing said printing rolls intermittently, a switch carried by the meter and controlled between two positions by the lobes of said cam, a second switch carried by the recorder, a normally open electric circuit connecting the switches and the solenoid, and trigger mechanism controlling said second switch between two positions and operable to cock by the solenoid, any lobe of said cam being adapted to actuate the first switch to close said circuit and energize the solenoid to advance the printing rolls and simultaneously cock the trigger mechanism and operate the second switch to again open said circuit, said lobe of the cam being adapted to release said first switch whereby the same moves to again close the circuit, and electrical means in said circuit controlling the trigger means to trip the same and energized upon the latter closing of the circuit to trip the trigger mechanism and release the second switch whereby the same moves to again open said circuit.

MAURICE K. HORAN.
JOHN W. CADE.

REFERENCES CITED

The following references are of record in the file of this patent:

UNITED STATES PATENTS

| Number | Name | Date |
|---|---|---|
| 946,961 | Gallagher | Jan. 18, 1910 |
| 1,191,177 | Hardey | July 18, 1916 |
| 1,742,072 | Hall | Dec. 31, 1929 |